Patented Aug. 7, 1945

2,381,825

UNITED STATES PATENT OFFICE 2,381,825

CATALYTIC CONVERSION PROCESS

Edward C. Lee, deceased, late of Chicago, Ill.; by Julia Southard Lee, administratrix, Ames, Iowa, and Jacob Elston Ahlberg, New York, N. Y., assignors to Universal Oil Products Company, Chicago, Ill., a corporation of Delaware No Drawing. Original application April 29, 1939, Serial No. 270,931. Divided and this application September 24, 1942, Serial No. 459,562

12 Claims. (Cl. 196—52)

This is a division of our co-pending application Serial No. 270,931, filed April 29, 1939, now Patent 2,316,260, granted April 13, 1943.

This invention relates to the treatment of hydrocarbon oils essentially for the purpose of reducing their hydrogen content.

More particularly, the invention relates to a modified process for primarily dehydrogenating hydrocarbon oils in the presence of particular and specific types of catalysts which function to selectively promote the desired reactions. The preferred catalysts useful for carrying out the hydrocarbon reactions are prepared by definite steps of procedure which are specific in the production of catalysts of high activity for prolonged use.

It has been found in the cracking of hydrocarbon oils in presence of catalysts that paraffinic oils, more particularly the paraffin hydrocarbons present in these oils, require more intensive conditions for their conversion into high antiknock gasoline than do the corresponding olefinic hydrocarbons. When using more intensive conditions such as higher temperatures, for example, the cracking catalysts are more rapidly rendered temporarily inert by the deposition of carbon causing reduced operating cycles, more frequent regeneration of the catalyst, shorter catalyst life and reduced economies generally. It is the object of this invention to provide a process where hydrocarbon oils above the motor fuel boiling point range which may be vaporized without substantial decomposition can be rendered more suitable as catalytic cracking stocks, valuable by-products being also produced such as gas rich in hydrogen and minor yields of high antiknock motor fuel.

Under conditions used, the preferred catalysts for the process of the present invention accelerate for the major part reactions involving the dehydrogenation and to some extent also the isomerization of paraffin hydrocarbons, and the dehydrogenation of naphthene hydrocarbons. Reactions involving scission of carbon to carbon bonds are accelerated to a relatively minor degree. Thus, predominating reactions which occur are illustrated by the dehydrogenation of cetanes, for example, various branched chain cetenes being formed which are more amenable to catalytic cracking than are the cetanes. The gaseous olefins which are formed in associated reactions to a very minor extent are readily polymerizable to form high antiknock motor fuel.

In one specific embodiment the present invention comprises a method for dehydrogenating hydrocarbon oils above the motor fuel boiling point range which may be vaporized without substantial decomposition at elevated temperature and at pressure below approximately 100 pounds per square inch, in contact with synthetically prepared catalytic material comprising hydrated silica together with a hydrated oxide of a metal selected from the group consisting of chromium, molybdenum, and uranium prepared by special methods of compositing or mixing so that alkali metal ions are excluded before calcining at high temperatures, said masses being highly refractory and capable of withstanding for long periods of time the conditions of temperature employed in alternate reaction and reactivation periods.

According to the present invention the hydrocarbon oils are processed in contact with the above mentioned catalysts which are prepared by special methods. It has been found that these catalysts which may be prepared by several alternative methods described in detail in the following paragraphs are rendered much more stable over long periods of use and also more active and selective in accelerating the desired hydrocarbon reactions when the originally precipitated hydrated silica which forms the primary material on which the remaining components are subsequently disposed, is substantially free from alkali metal ions which in the more general methods of preparation will be sodium ions inasmuch as the various sodium silicates constitute one of the more readily available raw materials for the manufacture of this type of catalyst.

One of the more convenient methods of preparing the silica gel is to acidify an aqueous solution of sodium silicate by the addition of an acid such as hydrochloric acid, for example. The excess acid and the concentration of the solution in which the precipitation is brought about determines in large measure the suitability of the silica hydrogel for subsequent compositing with the remaining component. More generally, suitable hydrated silica may be produced by the use of rather dilute solutions of sodium silicate and the addition of a moderate excess of acid whereby the desired active silica gel is obtained and conditions of filtering and washing are at an optimum. After precipitating the hydrated silica it may be treated and washed to substantially remove alkali metal ions according to one general method of preparation. It is not known whether the alkali metal ions such as sodium ions are present in the gel in chemical combination or in an adsorbed state, but it has been definitely determined that their removal is necessary if catalysts suitable for prolonged use in accelerating the desired reactions are to be obtained. It is possible that the presence of the alkali metal impurities causes a sintering or fluxing of the surfaces of the catalyst at elevated temperature so that the porosity is much reduced with corresponding reduction in effective surface. Alkali metal ions may be removed by treating with solutions of acidic materials, ammonium salts generally or salts, for example, of the metal ions of the component composited with the hydrated silica. When treating with acids as for example with hydrochloric acid, the acid extracts the alkali metal impurities in the silica gel. The salts formed and acid are then substantially removed by water washing treatment. Where ammonium salts or salts of the multivalent metals are used, the ammonium or multivalent metal used apparently displaces the alkali metal impurities present in the composite and the alkali metal salts formed together with the major portion of the multivalent metal salts are removed in the water washing treatment. Some of the multivalent metal introduced into the silica hydrogel in the purifying treatment may become a permanent part of the composite, whereas, in the treatment with ammonium salts, small amounts of the ammonium salts remaining after the washing process will be driven off in subsequent treatment at elevated temperatures.

In one of the methods of compositing the hydrated materials, the purified precipitated hydrated silica gel may be suspended in a solution of a salt of the metal ion of the component to be deposited in the desired proportion, and a hydrous oxide deposited upon the hydrated silica gel by the addition of volatile basic precipitants such as ammonium hydroxide, for example, or ammonium carbonate, ammonium hydrosulfide, ammonium sulfide or other volatile basic precipitants such as organic bases may be employed. According to this method, the purified silica gel may be suspended in a solution of chromic acid, for example, and a hydrous oxide of chromium precipitated by the addition of ammonium hydroxide. By another method, the purified hydrated silica gel may be mixed while in the wet condition with a solution of a salt of one of the designated metals containing the said metal in anion, and the hydrated metal oxide precipitated by the addition of an acid. According to this latter method, the purified silica gel may be suspended in an ammoniacal solution of ammonium molybdate, for example, and molybdic acid precipitated by the addition of hydrochloric acid.

Alternatively, the purified hydrated silica gel may be mixed while in the wet condition with a separately prepared hydrous oxide precipitated by the addition of volatile basic precipitants to a solution of a relatively pure salt of the metal constituting the metal oxide. The hydrated oxide thus prepared is substantially free from alkali metal ions and can be admixed with the purified silica gel. However, if alkali metal ions are added when adding the hydrated oxide to a precipitated silica from which alkali metal ions may have been excluded, regulated purification treatment and water washing will be subsequently required by methods selected from those described in connection with the purification of the hydrated silica gel to remove the alkali metal ions. Care should be observed in the selection and concentration of reagents used so as not to dissolve unduly large amounts of the added hydrated oxide. As further alternatives, the purified silica gel may be added to a solution of a metal salt of the metal oxide to be incorporated, said oxide being deposited by hydrolysis, with or without the use of heat, or the purified silica gel may be mixed with a suitable amount of the metal salt to form a paste and the paste heated whereby the metal oxide is deposited upon the silica gel as a result of the decomposition of the metal salt.

The character and efficiency of the ultimately prepared catalyst will vary more or less with the conditions of precipitation and/or mixing, purification treatment, ratio of components, calcining, etc. The ratio of components may be varied within wide limits, the limiting factor with respect to activity being more in evidence with small proportions of the added metal oxide component. In general, it appears that from 1 to 20 mol percent of the added metal oxide component with reference to silica may be considered an approximation of the range of proportions. Larger proportions of the added component may be used in many cases but with no materially improved results. On the other hand, too large proportions of the added component may be detrimental or reduce the activity when in prolonged use.

After the hydrated oxide has been mixed with or deposited upon the purified hydrated silica gel and water washed, if desired, the catalytic material may be recovered as a filter cake and dried at a temperature of the order of 240–300° F. more or less after which it may be formed into particles of a suitable size range from powder to various formed sizes obtained by pressing and sizing, or otherwise formed before or after drying into desired shapes by extrusion or compression methods. By calcining at temperatures of 1000° F. and upwards of approximately 1500° F., maximum activity of the catalyst is obtained and a stable catalyst is produced which maintains its activity over long periods of time.

Catalysts prepared by the various types of procedures outlined evidently possess a large total contact surface corresponding to a desirable porosity, the pores of the catalyst particles being of such size and shape that they do not become clogged with carbonaceous deposits after a long period of service and, therefore, their reactivation by oxidation is facilitated. This structure is also retained after many alternate periods of use and reactivation as evidenced by the fact that the catalysts may be repeatedly reactivated by passing air or other oxidizing gas over the spent particles to burn off deposits of carbonaceous material present at temperatures of approximately 800–1100° F. without apparently affecting the catalytic activity.

In accordance with the present invention catalysts, as above described may be conveniently utilized in the dehydrogenation treatment of high boiling hydrocarbon oils when employed as filling material in tubes or chambers in the form of small pellets or granules. In cases wherein hydrocarbon oil, particularly fractions thereof readily vaporizable at moderate temperatures without extensive decomposition are employed, the average particle size may be within the approximate range of 1–10 mesh which may apply either to pellets of uniform size and short cylindrical shapes or to particles of the regular size and shape produced by grinding, consolidating and sizing of the partially dehydrated catalytic material. As an alternative mode of operation, the catalyst may be suspended in a stream of the oil as a powder and treated under suitable conditions of temperature, pressure and contact time.

While the simple method of preheating a given fraction of the hydrocarbon oil vapors to a temperature suitable for their dehydrogenation in contact with the catalysts and then passing the vapors through a stationary mass of catalyst particles may be employed in some cases, it may be preferable to pass the preheated vapors through beds of the catalyst disposed in heat exchanger types of converters or through banks of relatively small diameter catalyst-containing tubes in multiple and parallel connections between headers having catalyst disposed in said tubes since these arrangements of apparatus are better adapted to permit heating and cooling of the catalyst masses to compensate for heat which may be absorbed in the dehydrogenating reactions and to dissipate the heat resulting during the regeneration of the catalyst with oxygen-containing gas.

The process of the present application, besides being characterized by the presence of novel catalysts, is further characterized by the moderate conditions of temperature and pressure. Temperatures employed in contact with the catalysts may be within the range of 850 to 1100° F. and subatmospheric or substantially atmospheric pressures or moderately superatmospheric pressures up to 90 pounds per square inch may be used, such pressures being somewhat affected by flow conditions through the vaporizing and conversion zones and the subsequent separating, fractionating and collecting equipment.

The following specific example is given to illustrate the process of the invention, a specific catalyst also being given. The process should not be considered as limited to this example of the process or to the specific catalyst mentioned, this being given as illustrative of the novelty and utility of the invention.

As an example of a catalyst suitable for processing according to the present invention, a catalyst containing a compound of chromium was prepared having the following approximate composition: 100 moles of precipitated silica ($SiO_2$) and 2 moles of chromic oxide ($Cr_2O_3$). Granules of 6–10 mesh prepared from this material were processed in contact with vapors of a Pennsylvania gas oil having an A. P. I. gravity of 37.3. The gas oil was vaporized, heated to a temperature of 932° F. under atmospheric pressure, and passed through the bed of catalyst. The products were cooled and condensed, the gasoline and gas produced in the process being separated from the partially dehydrogenated charging stock. The dehydrogenated stock had an A. P. I. gravity of 36.4 and a boiling point range curve approximately 10° F. lower than the curve of the starting material. 7.8% by volume of a 400° F. end-point gasoline was produced having a 69 octane number and 2.0% by weight of the charge of gas was produced having the following analysis:

| Component | Percent |
| --- | --- |
| Hydrogen | 67.1 |
| Methane | 8.4 |
| Ethylene | 3.8 |
| Ethane | 7.3 |
| Propene | 5.7 |
| Propane | 2.7 |
| Butenes | 3.6 |
| Butane | 1.4 |

In the appended claims the catalyst is designated as a "synthetic alkali metal ion-free catalytic mass" comprising essentially, or prepared by compositing hydrated silica with a precipitated hydrous oxide of a metal selected from the group consisting of chromium, molybdenum, and uranium. Some form of these compounds is involved during the preparation. However, the state of chemical combination, or the exact chemical form of the components incorporated into the catalyst after the catalyst preparation has been completed, is not known.

We claim as our invention:

1. A process for the conversion of hydrocarbon oils of boiling point range above motor fuel hydrocarbons to increase their olefin hydrocarbon content and concurrently produce minor yields of high antiknock motor fuel which comprises subjecting said hydrocarbon oil at a temperature within the approximate range of 850–1100° F. and below a pressure of approximately 90 pounds per square inch to contact with precalcined particles of a synthetic alkali metal ion-free catalytic mass comprising essentially hydrated silica composited with a precipitated hydrous oxide of a metal selected from the group consisting of chromium, molybdenum, and uranium.

2. A process for the conversion of hydrocarbon oils of boiling point range above motor fuel hydrocarbons to increase their olefin hydrocarbon content and concurrently produce minor yields of high antiknock motor fuel which comprises subjecting said hydrocarbon oil at a temperature within the approximate range of 850–1100° F. and below a pressure of approximately 90 pounds per square inch to contact with precalcined particles of a synthetic alkali metal ion-free catalytic mass comprising essentially hydrated silica composited with a precipitated hydrous oxide of a metal selected from the group consisting of chromium, molybdenum and uranium, directing the treated vapors from said contact to a fractionator to separate and remove minor yields of motor fuel boiling point range hydrocarbons, condensing, cooling and separating said motor fuel hydrocarbons from normally gaseous products.

3. A process as recited in claim 2 where the catalytic mass comprises essentially hydrated silica composited with a hydrous oxide of chromium.

4. A process as recited in claim 2 where the catalytic mass comprises essentially hydrated silica composited with a hydrous oxide of molybdenum.

5. A process for the conversion of hydrocarbon oils of boiling point range above motor fuel hydrocarbons to increase their olefin hydrocarbon content and concurrently produce minor yields of high antiknock motor fuel which comprises subjecting said hydrocarbon oil at a temperature within the approximate range of 850–1100° F. and below a pressure of approximately 90 pounds per square inch to contact with precalcined particles of a synthetic alkali metal ion-free catalytic mass prepared from a silica hydrogel suspended in a solution of a salt of a metal selected from the group consisting of chromium, molybdenum, and uranium, from which a hydrous oxide has been precipitated by the addition of a volatile basic precipitant; directing the treated vapors from said contact to a fractionator to separate and remove minor yields of motor fuel boiling point range hydrocarbons, condensing, cooling and separating said motor fuel hydrocarbons from normally gaseous products.

6. A process for the conversion of hydrocarbon oils of boiling point range above motor fuel hydrocarbons to increase their olefin hydrocarbon content and concurrently produce minor yields of high antiknock motor fuel which comprises subjecting said hydrocarbon oil at a temperature within the approximate range of 850-1100° F. and below a pressure of approximately 90 pounds per square inch to contact with particles of a composited catalytic mass prepared by precipitating a silica hydrogel from a solution of an alkali metal silicate by the acidification thereof, washing and treating said hydrogel with a purifying agent and water to substantially remove all alkali metal compounds therefrom, suspending the purified hydrogel in a substantially alkali metal ion-free solution of a salt of a metal selected from the groups consisting of chromium, molybdenum, and uranium, precipitating a hydrous oxide in the presence of a suspended silica hydrogel by the addition of a volatile basic precipitant, forming particles from the precipitated material and drying and calcining at temperatures of approximately 1000-1500° F.; directing the treated vapors from said contact to a fractionator to separate and remove minor yields of motor fuel boiling point range hydrocarbons, condensing, cooling and separating said motor fuel hydrocarbons from normally gaseous products.

7. A process for the conversion of hydrocarbon oils of boiling point range above motor fuel hydrocarbons to increase their olefin hydrocarbon content and concurrently produce minor yields of high antiknock motor fuel which comprises subjecting said hydrocarbon oil at a temperature within the approximate range of 850-1100° F. and below a pressure of approximately 90 pounds per square inch to contact with particles of a catalytic mass prepared by mixing in the wet condition a precipitated silica hydrogen substantially free from alkali metal ions with a precipitated hydrous oxide of a metal selected from the group consisting of chromium, molybdenum, and uranium, said hydrous oxide being substantially free from alkali metal ions, drying and forming particles of definite sizes from the mixed precipitates, and calcining at temperatures of approximately 1000-1500° F.; directing the treated vapors from said contact to a fractionator to separate and remove minor yields of motor fuel boiling point range hydrocarbons, condensing, cooling and separating said motor fuel hydrocarbons from normally gaseous products.

8. A process for the conversion of hydrocarbon oils of boiling point range above motor fuel hydrocarbons to increase their olefin hydrocarbon content and concurrently produce minor yields of high antiknock motor fuel which comprises subjecting said hydrocarbon oil at a temperature within the approximate range of 850-1100° F. and below a pressure of approximately 90 pounds per square inch to contact with particles of a composited catalytic mass prepared by mixing a substantially alkali metal ion-free solution of a salt of a metal selected from the group consisting of chromium, molybdenum, and uranium, with a precipitated hydrated silica substantially free from alkali metal ions, heating the admixture to deposit a hydrous oxide by decomposing a metal salt and removing a major proportion of the water content, forming particles of definite sizes and calcining at temperatures within the approximate range of 1000-1500° F.; directing the treated vapors from said contact to a fractionator to separate and remove minor yields of motor fuel boiling point range hydrocarbons, condensing, cooling and separating said motor fuel hydrocarbon from normally gaseous products.

9. A process for the conversion of hydrocarbon oils which comprises subjecting the hydrocarbon oil at a temperature in the approximate range of 850-1100° F. to the action of a catalyst prepared by compositing a hydrated silica with a precipitated hydrous oxide of a metal selected from the group consisting of chromium, molybdenum and uranium and calcining said composite, said catalyst being substantially free of alkali metal ions.

10. A process for the conversion of hydrocarbon oils which comprises subjecting the hydrocarbon oil at a temperature in the approximate range of 850-1100° F. to the action of a catalyst prepared by compositing a hydrated silica substantially free of alkali metal ions with a precipitated hydrous oxide of a metal selected from the group consisting of chromium, molybdenum and uranium and calcining said composite.

11. The process as defined in claim 9 further characterized in that said oil comprises hydrocarbons heavier than gasoline.

12. The process as defined in claim 10 further characterized in that said oil comprises hydrocarbons heavier than gasoline.

JULIA SOUTHARD LEE,
*Administratrix of the Estate of Edward C. Lee, Deceased.*

JACOB ELSTON AHLBERG.